Dec. 6, 1960 W. A. CHRISTOPHERSON 2,963,549

METHOD AND APPARATUS FOR CORRECTING ELECTRICAL SIGNAL DISTORTION

Filed July 7, 1958 2 Sheets-Sheet 1

INVENTOR.
WARREN A. CHRISTOPHERSON

BY Robert H. Fraser

ATTORNEY

Dec. 6, 1960 W. A. CHRISTOPHERSON 2,963,549

METHOD AND APPARATUS FOR CORRECTING ELECTRICAL SIGNAL DISTORTION

Filed July 7, 1958 2 Sheets-Sheet 2

INVENTOR.
WARREN A. CHRISTOPHERSON

BY [signature]

ATTORNEY 2,963,549
Patented Dec. 6, 1960

2,963,549

METHOD AND APPARATUS FOR CORRECTING ELECTRICAL SIGNAL DISTORTION

Warren A. Christopherson, San Jose, Calif., assignor to International Business Machines Corporation, New York, N.Y., a corporation of New York Filed July 7, 1958, Ser. No. 746,919
14 Claims. (Cl. 178—69)

This invention relates to a new and improved method and apparatus for transmitting electrical signals and more particularly to a new and improved method and apparatus for correcting distortion of electrical signals arising in a signal transmission system.

In one system for the transmission of electrical signals, a carrier wave is modulated at the transmitter with the signal information and the carrier wave is demodulated at a receiver to recover the signal information. Where the overall band width of the transmission medium is limited, as where signals are transmitted over telephone lines, conservation of the band width may be achieved through transmission of only a single side band of frequencies produced at the transmitter to the receiver. Demodulation of single side band signals generally requires the generation of an alternating current wave at the receiver of the same frequency and phase as the carrier wave with which the received signal side band signal is compared to derive the signal information.

In many instances the wave generated at the receiver is not exactly in synchronism with the carrier wave produced at the transmitter and the result is that the signal information derived at the receiver may be distorted in phase and frequency with respect to the signals applied to the transmitter. For normal voice transmission, the phase and frequency distortion is of little consequence, but where the electrical signals being transmitted comprise a series of data pulses, the appearance of a phase or frequency shift in the electrical signal frequently upsets the operation of terminal equipment. In general, terminal equipment functioning in response to electrical pulses is actuated by the leading edge of each received pulse and a phase or frequency shift of the electrical signal may alter the position of the leading edge with respect to time to actuate the terminal equipment at improper times.

Where it is feasible to interconnect a transmitter oscillator and a receiver oscillator in a signal transmission system to generate accurately synchronized waves at both the transmitter and receiver, the problem of phase and frequency distortion may be readily overcome. However, in many instances it is necessary to transmit signals via a transmission system in which the receiver oscillator is not sufficiently accurately synchronized with the transmitter oscillator for the reliable transmission of undistorted signal information in the form of data pulses.

For example, where the transmission system facilities comprise telephone lines or radio relay stations under the control of a public utility company, the transmitter and receiver oscillators are generally only well enough synchronized for the satisfactory transmission of voice signals, and produce a relatively large distortion of data pulse signals. Since the user has no direct control over the oscillators in the transmission system supplied by the public utility company, there has been no satisfactory way of overcoming the problem of the phase and frequency distortion of signals passed via a carrier transmission system.

The present invention is directed to a new and improved method and apparatus for generating corrected output signals where signals are transmitted via a transmission system in which distortion occurs. Accordingly, it is a principal object of the present invention to provide a new and improved method and apparatus for the correction of distortion arising from phase or frequency error in a transmission system.

It is another object of the present invention to provide a new and improved transmission system in which distortion of an electrical signal is corrected through the remodulation of a received distorted signal.

It is yet another object of the present invention to provide a system for correcting distortion of an electrical signal in which a reference wave is transmitted along with the signal information via a transmission system and an error signal derived from the reference wave is employed to produce a corrected output signal.

Briefly, in accordance with the invention, there is provided a new and improved method and apparatus for the transmission of electrical signals in which the electrical signals are transmitted via a carrier system, the received signals are remodulated, and a corrected output signal is derived from the remodulated signal.

In one particular embodiment of the invention a remodulated signal is produced by a modulator from which is separated a single side band signal and an envelope sensing device is employed to derive an output signal bearing an accurate phase relationship to a signal originally transmitted by a carrier system.

In accordance with another embodiment of the invention, a pair of reference waves having a predetermined difference frequency are transmitted along with information signals via a carrier system in which a phase or frequency error occurs, the received electrical signals are remodulated, a single side band signal is derived from the remodulated signal, the pair of reference frequency waves are compared to derive an error signal indicative of the extent of the phase or frequency error, and the single side band signal is demodulated by comparison with a wave of adjusted frequency and phase controlled by the error signal in such a way that a corrected output signal is produced corresponding to the signal originally transmitted by the carrier system.

A better understanding of the invention will be had from a reading of the following detailed description and an inspection of the drawings, in which.

Figure 1:
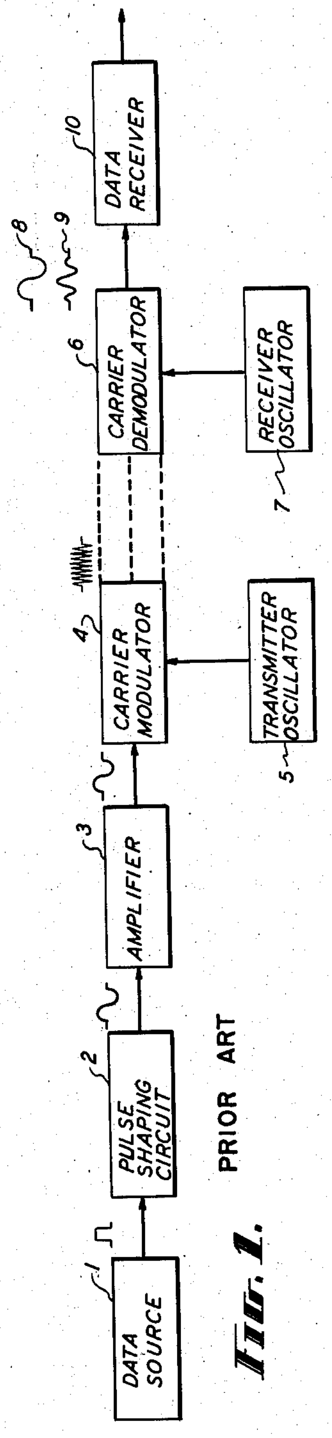
Fig. 1 is a block diagram of a carrier signal transmission system in which distortion of a transmitted signal may occur.

In Fig. 1 there is shown a typical carrier wave transmission system for transmitting pulses representing digital information from a transmitter location to a receiver location. At the transmitter location pulses from a data source 1 are applied to a pulse shaping circuit 2 which produces an electrical signal in the form of a sine wave oscillation corresponding to each pulse from the data source 1. The sine wave signals from the pulse shaping circuit 2 are amplified by means of an amplifier 3 and applied to a carrier modulator 4 which modulates a carrier wave from a transmitter oscillator 5 with the sine wave signals.

Generally, carrier systems for the transmission of electrical signals are arranged to produce a wave of compressed band width for transmission over a telephone line or radio relay station in order to conserve the band width so that a number of separate signals may be transmitted simultaneously through the use of a number of different carrier wave frequencies. The dashed lines connecting the carrier modulator 4 and the carrier demodulator 6 are intended to represent the portions of a conventional carrier wave transmission system adapted to pass a modulated wave from a transmitting location to a receiving location. Accordingly, included between the carrier modulator 4 and the carrier demodulator 6 may be suitable single side band filters, amplifiers or radio transmitters not shown in Fig. 1.

At the receiver location, the carrier wave is compared with a locally generated wave derived from a receiver oscillator 7 by means of a carrier demodulator 6 which derives an electrical signal corresponding to the transmitted signal information from the transmitted carrier wave. Where the receiver oscillator 7 is in exact synchronism both in frequency and phase with the transmitter oscillator 5, the signal supplied by the carrier demodulator 6 corresponds exactly to the sine wave oscillations produced by the pulse shaping circuit 2 as indicated by the waveform marked 8. However, where the receiver oscillator 7 produces a wave of slightly different frequency or of different phase, distortion occurs in the output signal from the carrier demodulator 6 as indicated by the waveform 9. In a conventional carrier transmission system a data receiver 10 is connected to the carrier demodulator 6 and suitable terminal equipment may be connected to the data receiver 10 for utilization of the transmitted information signals. A comparison of the waveforms 8 and 9 indicates graphically the manner in which the position of the leading edge of the received signal may vary due to the occurrence of distortion. Where the relative timing of the leading edge of the received pulses varies, a disturbance of the operation of the terminal apparatus may arise which is commonly known as the "jitter" effect.

Since the degree to which distortion of this type occurs in the carrier transmission system is a function of the lack of synchronism between the oscillators 5 and 7, one solution to the problem is to provide an interconnection between the oscillators 5 and 7 which functions to lock the frequency and phase of the waves derived from the oscillators 5 and 7 in synchronism. However, generally the transmission system is under the control of a public utility company, as where the transmission system comprises a radio relay or telephone line, and accordingly, the desired synchronism between the oscillators 5 and 7 may not be feasible for the user of the system. Generally, a public utility company in transmitting information maintains a degree of synchronism between the transmitter oscillator 5 and the receiver oscillator 7 suitable for voice transmission in which a certain amount of phase or frequency error in the transmitted signal is insignificant. However, where a user of the transmission link attempts to transmit pulse information, the phase or frequency error occurring in the system cannot be tolerated where the received signals must bear an accurate time relationship to the transmitted pulses.

Figure 2:
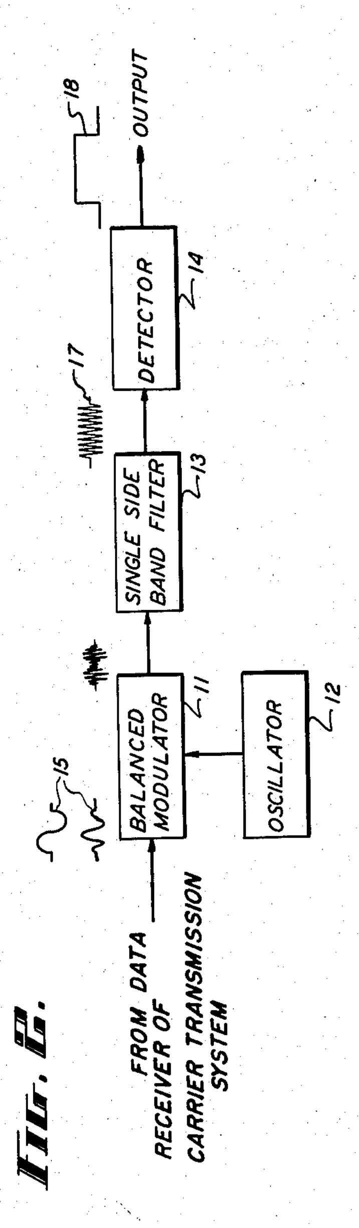
Fig. 2 is a block diagram of a system for correcting the distortion of a received signal in accordance with the invention.

In accordance with the present invention there are described below two exemplary systems for correcting the distortion appearing in a conventional carrier transmission system due to a phase or frequency error. The simpler of the correction systems is illustrated in Fig. 2 in which a signal from a data receiver such as the data receiver 10 of Fig. 1 is applied to a balanced modulator 11 which receives a wave derived from an oscillator 12 and produces a suppressed carrier wave modulated in accordance with the distorted received signal information. The suppressed carrier wave from the modulator 11 contains modulation products falling into two separate side bands on each side of the carrier frequency. One of the side bands from the modulator 11 is passed by a single side band filter 13 so that there is applied to a detector 14 the modulation products from the modulator 11 falling within one side band only. Since the frequency of a sine wave signal 15 applied to the modulator and representing a transmitted pulse produces modulation products equal to the sum and difference of the frequencies of the sine wave 15 and the wave from the oscillator 12, there appears at the output of the modulator 11 a wave having a frequency equal to the sum of the frequency of the sine wave 15 and the wave from the oscillator 12 and a wave having a frequency equal to the difference between the frequency of the sine wave 15 and the wave from the oscillator 12.

Figure 3:
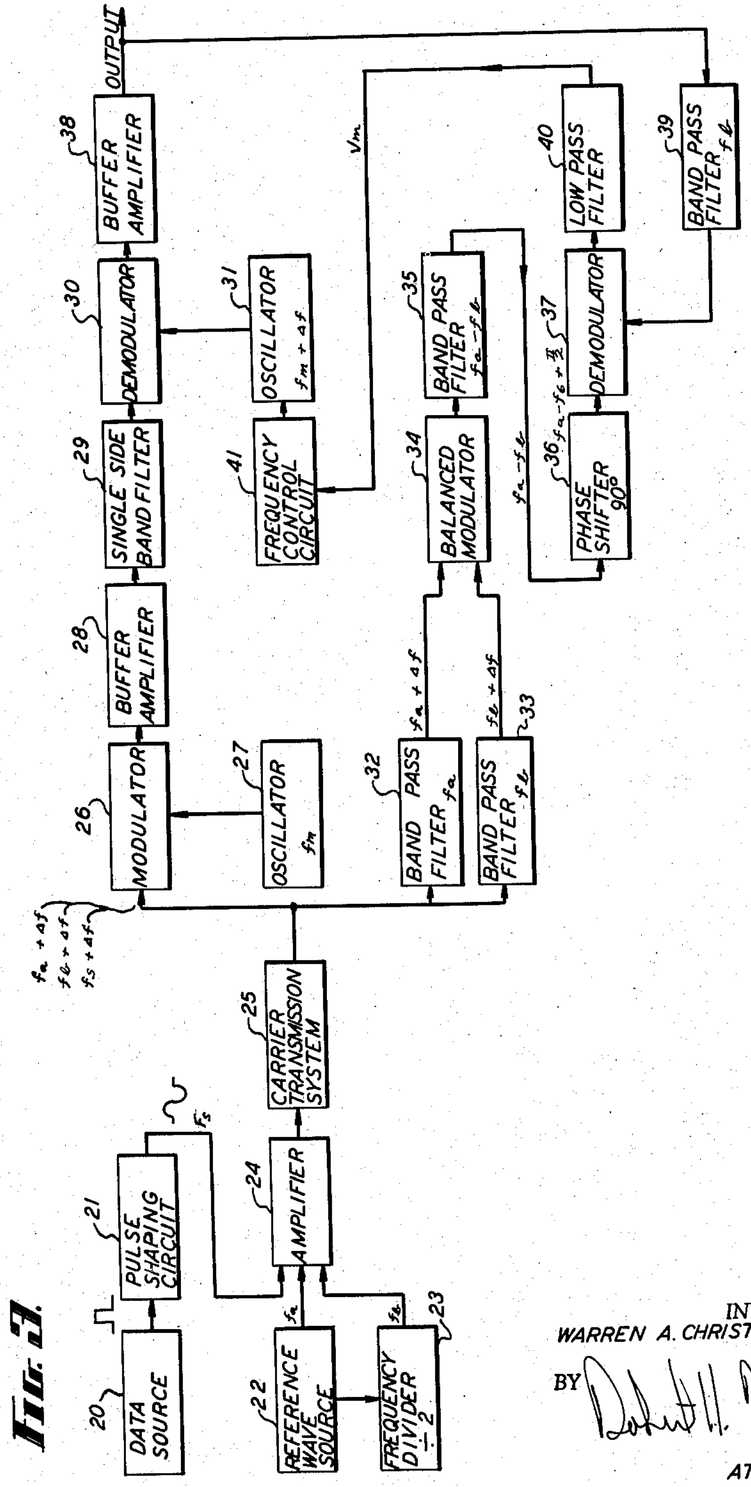
Fig. 3 is a block diagram of a carrier transmission system including apparatus for deriving a corrected output signal by a comparison of a pair of reference waves transmitted via the carrier system.

The single side band filter 13 functions to pass a single one of the waves with the result that a wave of substantially constant amplitude as indicated by the waveform 17 appears at the output of the single side band filter 13. The detector 14 functions as an envelope sensing device which follows the amplitude of the wave 17 to produce an output signal 18 following the peaks of the alternations of the wave 17. Although the output signal 18 may be of substantially longer duration than the originally transmitted pulse from the data source 1 of Fig. 1, the leading edge of the output pulse 18 will be accurately synchronized in time with respect to the transmission of the original data pulse. Accordingly, the output signal 18 may be readily applied to terminal equipment in which an actuation of a device occurs by the leading edge of the pulse with the assurance that any frequency or phase error occurring in the carrier transmission system will not adversely affect the operation of the terminal equipment.

Where a carrier transmission system is employed and it is desired to recover an output signal having the same waveform as a transmitted signal as well as an output signal which is corrected for phase or frequency error in the transmission system, the arrangement of Fig. 3 may be employed in which reference waves are transmitted along with the information signals from which may be derived an error signal indicating the extent of the frequency or phase error occurring in the carrier transmission system. The error signal may be used to control a remodulation or demodulation process to effect a correction of a distorted signal and to recover an output signal having a waveform identical to the waveform of the transmitted signal.

In Fig. 3 there is shown a complete data transmission system including means for correcting distortion produced by phase or frequency error in which data signals from a data source 20 are applied to a pulse shaper 21 which produces a sine wave oscillation corresponding to each pulse from the data source 20. Along with the information signals from the pulse shaper 21 there is transmitted a reference wave from a reference wave source 22 of a predetermined frequency, $f_a$. In addition, there is transmitted a secondary wave which has a frequency, $f_b$, bearing a definite difference frequency and phase relationship to the wave from the reference wave source. For example, in the arrangement of Fig. 3, $f_b$ may be one-half of the frequency, $f_a$, of the wave from the reference wave source 22 and may be derived by means of a frequency divider 23. The waves from the reference wave source 22 and the frequency divider 23 have a predetermined constant difference between their frequencies, $f_a - f_b$, which is the same both at the transmitter and at the receiver of the carrier system.

The reference waves from the reference wave source 22 and the frequency divider 23 are combined with the information signal from the pulse shaper 21 to form a composite signal which is amplified prior to transmission in an amplifier 24. The amplified composite output signal from the amplifier 24 is applied to the conventional carrier transmission system 25 which may include a carrier modulator, a transmitter oscillator, a carrier demodulator and a receiver oscillator similar to that described above in connection with Fig. 1. A lack of synchronism between the transmitter oscillator and the receiver oscillator in the carrier transmission 26 produces a frequency or phase error which distorts the output signal and cannot be tolerated in the transmission of pulse information which must be accurately timed.

The composite signal appearing at the output of the carrier transmission system may be represented by equations representing the frequency of the separate signals included in the composite signal. Accordingly, where the reference wave source produces a reference wave having a frequency equal to $f_a$, the frequency of the corresponding wave from the carrier transmission system may have a frequency equal to $f_a+\Delta f$, where $\Delta f$ equals the frequency or phase error between the transmitter oscillator and the receiver oscillator in the carrier transmission system 25. Similarly, where the frequency of a wave from the frequency divider 23 equals $f_b$, the corresponding wave from the carrier transmission system 25 may have a frequency equal to $f_b+\Delta f$, where $\Delta f$ equals the frequency or phase error between the transmitter oscillator and the receiver oscillator in the carrier transmission system 25.

The distortion appearing in the output signal corresponding to the signal from the pulse shaper 21 may be similarly represented where $F_s$ equals the frequency of the sine wave from the pulse shaper 21 and a corresponding signal appears at the output of the carrier transmission system 25 having a frequency equal to $F_s+\Delta f$ where $\Delta f$ represents the frequency or phase error between the transmitter oscillator and the receiver oscillator in the carrier transmission system 25. From the equations representing the frequency of the wave appearing at the output of the carrier transmission system 25 it is apparent that the phase or frequency error arising from a lack of synchronism between the transmitter oscillator and the receiver oscillator acts in a similar fashion on each of the transmitted signals. However, since the reference waves from the reference wave source 22 and the frequency divider 23 are affected in like fashion by the factor $\Delta f$, the difference frequency between the reference waves remains the same at the output of the carrier transmission system as it was prior to transmission.

The received distorted signal from the carrier transmission system 25 is remodulated in the phase correcting system of Fig. 3 by means of a balanced modulator 26 which produces a suppressed carrier wave having a frequency equal to a wave derived from an oscillator 27. The suppressed carrier wave from the modulator 26 is amplified by means of a buffer amplifier 28 and a single one of the side bands is separated from the suppressed carrier wave by means of a single side band filter 29. The single side band passed by the filter 29 is then applied to a demodulator 30 which compares the single side band signal with a wave of adjusted frequency and phase derived from an oscillator 31. The oscillator 31 is controlled in its frequency by an error signal derived from a comparison of the reference waves passed by the carrier transmission system 25. Accordingly, one of the reference waves may be separated from the composite transmitted signal by means of a band pass filter 32 having a center frequency, $f_a$, corresponding to the frequency of the wave from the reference wave source 22 and the other reference wave may be separated from the composite signal by means of a band pass filter 33 having a center frequency, $f_b$, equal to the frequency of the reference wave from the frequency divider 23. For example, the wave from the reference wave source 22 may have a frequency, $f_a$, of 600 cycles per second, and the frequency divider 23 may effect a division by a factor of two to produce a wave having a frequency, $f_b$, of 300 cycles per second, so that the band pass filter 32 may have a center frequency of 600 cycles per second and the band pass filter 33 may have a center frequency of 300 cycles per second.

The separated waves from the band pass filters 32 and 33 are applied to a balanced modulator 34 which produces modulation products including a different frequency wave corresponding to the difference in frequency between the distorted reference waves passed by the band pass filters 32 and 33. Since the phase distored reference waves each contain the factor $\Delta f$ which represents the extent of the frequency or phase error, the component $\Delta f$ disappears in the difference frequency wave. By means of a band pass filter 35 which may have a center frequency $f_a-f_b$, a wave may be derived having a frequency equal to $f_a-f_b$ which in the example given above equals 300 cycles per second. However, since the reference frequency waves are subjected to a like amount of frequency or phase error in the form of the factor $\Delta f$, the error is cancelled and a difference frequency wave is provided whose frequency and phase is constant irrespective of the amount of frequency or phase distortion occurring in the carrier transmission system 25. The difference frequency wave from the band pass filter 35 is applied to a phase shifter 36 which shifts the phase of the difference frequency wave by 90° prior to application of the difference frequency wave to a demoduator 37. Where phase error is produced in the transmission system of a constant amount in addition to the frequency or phase error arising from a lack of synchronism of the transmitter and receiver oscillators, a correction may be made by adjusting the phase shift produced by the phase shifter 36 in a direction and to an extent to compensate for the amount of constant phase error present.

The demodulator 37 receives a wave corresponding to the lower frequency reference wave appearing at the output of the demodulator 30 which is amplified by means of a buffer amplifier 38. The lower frequency reference wave may be separated from the modulation products of the demodulator 30 by means of a band pass filter 39 having a center frequency, $f_b$, which may be, for example, 300 cycles per second, in the example given above.

The demodulator 37 functions to compare the difference frequency wave, $f_a-f_b$, with the lower frequency reference wave $f_b$ originally supplied by the frequency divider 23. However, since the difference frequency wave is shifted in phase by 90° by the phase shifter 36, the demodulator 37 supplies a zero output signal where the frequency and phase of the difference frequency wave is equal to the frequency and phase of the wave passed by the band pass filter 39. In the absence of any frequency or phase error in the system it is apparent that the difference frequency $f_a-f_b$ is exactly equal to and in phase with the lower frequency of the reference wave $f_b$, where $f_b$ is one-half the frequency of $f_a$. However, in the presence of frequency or phase error, the signal passed by the band pass filter 39 will contain a component which will cause the demodulator 37 to produce an output signal representing the frequency or phase error which may be separated from the modulation products by means of a low pass filter 40. The low pass filter 40 should have a low enough cut-off frequency to separate the error signal from the other modulation products effectively, but should be capable of passing rapidly fluctuating error signals during transient intervals to follow fluctuations in the degree of phase or frequency error occurring in the transmission system. For example, where $f_a$ is 600 cycles per second and $f_b$ is 300 cycles per second, a cut-off frequency within the range of from 10 to 100 cycles per second is suitable.

The error voltage from the low pass filter 40 may be applied to a frequency control circuit 41 which functions to alter the frequency and phase of the oscillator 31 to a frequency equal to $f_m+\Delta f$ and having a correct phase. Thus, the frequency or phase error occurring in the carrier transmission system due to a difference in frequency or phase between the transmitter oscillator and the receiver oscillator may be reversed in the phase correction system of Fig. 3 by altering the frequency of the oscillator 31 in a direction and to an extent which will demodulate the remodulated signal produced by the modulator 26 until an equal and opposite amount of phase distortion appears in the modulation products from the demodulator 30. The frequency or phase distortion is cancelled with the result that a corrected signal is passed to the buffer amplifier 38 which is substantially free of all distortion produced in the carrier transmission system by phase or frequency error between the transmitter and receiver oscillators.

Where the frequency of the oscillator 31 is exactly adjusted to produce an undistorted and corrected output signal, the lower frequency reference wave passed by the band pass filter 39 is exactly equal in phase and frequency to the difference frequency wave applied to the demodulator 37. By a suitable adjustment of the circuit which functions effectively as a closed loop servo system, the extent of the difference in phase between the difference frequency wave and the wave passed by the band pass filter 39 required to produce a suitable error signal for a proper adjustment of the oscillator 31 may be made to be very small. Accordingly, the output signal is a near perfect reproduction of the signal supplied by the pulse shaper 21 and may be readily applied to sensitive terminal equipment with substantially no "jitter" effect being produced due to frequency or phase error in the carrier transmission system.

Although in the system of Fig. 3 the error signal has been applied to the oscillator associated with the demodulator 30 for a correction of the frequency or phase error appearing in the carrier transmission system 25, it will be appreciated that the identical correction process may take place through an adjustment of the frequency of the oscillator 27 associated with the modulator 26 in lieu of a correction of the frequency of the oscillator 31 associated with the demodulator 30.

A particular feature of the arrangement of Fig. 3 is that a pair of separate information signals may be simultaneously transmitted where the sine waves provided by the pulse shaper 21 bear a 90° phase relationship since with the distortion corrected output signals a complete separation by well known techniques can be effected of waves which bear a 90° phase relationship. Accordingly, the phase correcting system illustrated in Fig. 3 is capable of doubling the number of signals which may be simultaneously transmitted within the bandwidth of a given carrier transmission system.

Throughout the several figures of the drawings, block diagrams have been employed in order to simplify the explanation. Since each of the blocks individually represents a well known structure long used for other purposes, no detailed circuit description of the apparatus contained in each block is considered necessary. However, the following references are given as sources of further information concerning the structure of each of the various blocks employed in the exemplary systems of the invention for convenience. Suitable crystal controlled oscillators for use as the fixed frequency oscillators 12 and 27 may be found in Albert's book entitled "Electrical Communication," Third Edition, published by Wiley in 1950; a suitable voltage controlled oscillator including a reactance tube control circuit for use as a frequency control circuit 41 and variable frequency oscillator 31 may be found at page 601 of Terman's "Electronic and Radio Engineering," published by McGraw-Hill in 1955, Fourth Edition; suitable balance modulator circuits may be found at page 421 of Albert's "Electrical Communication" supra as well as at page 410 of a book entitled "Waveforms," comprising volume 19 of the MIT Radiation Laboratory Series, published in 1947 by McGraw-Hill; a band pass filter of the constant *k* variety with *m*-derived end sections for separating a single side band from a suppressed carried signal for use as the single side band filters 13 and 29 of Figs. 2 and 3 may be found in the "Federal Telephone and Telegraph Radio Engineering Handbook"; a suitable phase shifting circuit for use as the phase shifter 36 of Fig. 3 may be found at page 137 of the "Waveforms" book supra; a detector for use as an envelope sensing circuit in the structure of Fig. 2 may comprise a condenser and resistor connected serially in the manner of an integrating circuit; and the demodulator 37 of the apparatus of Fig. 3 may comprise a synchronous or ring modulator circuit substantially similar to that described and mentioned above at page 410 of the "Waveforms" handbook to which is connected a conventional low pass filter to separate the modulation products representing the substantially unidirectional error signal from the upper frequency modulation products.

Although two alternative embodiments of the invention have been illustrated above and other suggested alternative arrangements are indicated in the detailed description, it should be understood that these are given by way of examples only, of arrangements and methods by which the invention may be employed in the transmission of signal information. Accordingly, the invention should be given the full scope of any modifications, equivalents and alternative arrangements falling within the scope of the annexed claims.

What is claimed is:

1. In a system for correcting the phase distortion introduced into an electrical signal transmitted and received in a carrier transmission system the combination of an alternating current wave source, means for modulating a wave from the alternating current wave source in accordance with the received distorted electrical signal, and means coupled to the modulating means for deriving a corrected electrical signal substantially free from the effects of phase distortion introduced by said carrier transmission system.

2. In a system for correcting the distortion introduced into an electrical signal transmitted and received in a carrier transmission system the combination of means for generating a suppressed carrier wave modulated in accordance with the received distorted signal having a pair of side bands, means coupled to the modulating means for separating one of the side bands from the suppressed carrier wave, and means coupled to the separating means for deriving a corrected electrical signal from the separated side band.

3. In a system for correcting distortion introduced into an electrical signal transmitted and received in a carrier transmission system the combination of a source of alternating current waves, a modulator coupled to the source of alternating current waves for generating a suppressed carrier wave modulated in accordance with the received signal, means for sensing the extent of the distortion of the electrical signal, and means coupled between the distortion sensing means and the modulator for deriving a corrected output signal.

4. A system for correcting the distortion of an electrical signal including the combination of a source of alternating current waves of predetermined frequency, a modulator coupled to the source of alternating current waves for generating a suppressed carrier wave containing modulation products representing the distorted electrical signal, a filter coupled to the modulator for deriving selected ones of the modulation products from the suppressed carrier wave, and an envelope detection means coupled to the filter for deriving a corrected output signal.

5. A system for correcting the distortion of an electrical signal including the combination of a source of alternating current waves of predetermined frequency, a modulator coupled to the source of alternating current waves for generating a suppressed carrier wave containing modulation products representing the distorted electrical signal, a filter coupled to the modulator for deriving selected ones of the modulation products from the suppressed carrier wave, a demodulator coupled to the filter, means for sensing the extent of the distortion of the electrical signal, and means supplying alternating current waves to the demodulator having a frequency adjusted in accordance with the extent of the distortion whereby a corrected output signal is produced by the demodulator representing the electrical signal.

6. In a signal transmission system in which distortion of an electrical signal occurs in one portion of the transmission system, a system for correcting the phase distortion including the combination of means transmitting a reference wave along with an electrical signal via the signal transmission system, means for remodulating the transmitted electrical signal, means for deriving a voltage from the reference wave having a value corresponding to the extent of the distortion occurring in the system, and means connected between the voltage deriving means and the remodulator for deriving a corrected output signal corresponding to the originally transmitted electrical signal.

7. A signal processing circuit for use in connection with an information transmission system in which data signals are transmitted via a modulated carrier wave and in which distortion occurs due to a lack of synchronism between the frequency of the modulated carrier wave and the frequency of a wave employed to demodulate the carrier wave, including the combination of a data receiver for receiving the distorted demodulated carrier wave, modulating means connected to the data receiver for producing a remodulated wave bearing the distorted signal information, a single side band filter connected to the modulator to pass selected ones of the modulation products contained in the remodulated wave, and a signal demodulation circuit connected to the single side band filter for producing a corrected output signal corresponding to the originally transmitted signal.

8. In a signal transmission system in which signal information is transmitted by means of a modulated carrier wave and in which a distortion of the signal information occurs due to a lack of synchronism between the frequency of the carrier wave and the frequency of a wave employed to demodulate the carrier wave, the combination of a data receiver adapted to receive a demodulated carrier wave, a modulating means coupled to the data receiver for producing a suppressed carrier modulated wave comprising a pair of side bands, a single side band filter connected to the modulating means for passing a selected one of the side bands, and waveform sensing means connected to the single side band filter for deriving signal information from the side band passed from the single side band filter corresponding to the originally transmitted signal information.

9. In a signal transmission system in which signal information is transmitted by means of a modulated carrier wave and in which distortion occurs due to a lack of synchronism between the carrier wave and a demodulated wave employed to derive the signal information from the modulated carrier wave, the combination of a modulator adapted to receive the signal information derived from the carrier wave, said modulator being adapted to produce a suppressed carrier output signal bearing the demodulated signal information in a pair of side bands, a single side band filter connected to the modulator for passing a selected one of the side bands, and an envelope detector circuit connected to the single side band filter for providing an output signal having a wave shape corresponding to the single side band passed by the single side band filter whereby distortion produced in the carrier transmission system is corrected in the output signal from the envelope detector circuit.

10. A system for transmitting data pulses including the combination of a source of data pulses, a first reference wave source for producing a wave of a first predetermined frequency, a second reference wave source for providing a wave having a second predetermined frequency having a constant frequency difference with respect to the first predetermined frequency, a carrier transmission system coupled to the data source, the first reference wave source and the second reference wave source, said carrier system being susceptible to a distortion of the data pulses, a modulator connected to the carrier system for remodulating the distorted signal information, means for comparing the received first reference wave and the received second reference wave to produce a difference frequency signal, means comparing the difference frequency signal with one of the received reference frequency waves to produce an error signal indicative of the extent of the distortion occurring in the carrier transmission system, a demodulator coupled to the modulator, and means for applying a wave to the demodulator adjusted in accordance with the error signal whereby a corrected output signal is supplied by the demodulator corresponding to the data pulses originally transmitted by the carrier system.

11. A system for transmitting data pulses including the combination of a source of data pulses, a reference wave source for producing a wave of a predetermined frequency, a frequency divider circuit connected to the reference wave source for providing a wave having a frequency equal to one-half of said predetermined frequency, a carrier transmission system coupled to the data source, the reference wave source and the frequency divider circuit, said carrier system being susceptible to a distortion of the data pulses, a modulator connected to the carrier system for remodulating the distorted signal information, means for comparing the received reference wave and the received wave of one-half the reference wave frequency to produce a difference frequency signal, means comparing the difference frequency signal with the received wave of one-half the reference frequency to produce an error signal indicative of the extent of the distortion occurring in the carrier transmission system, a demodulator coupled to the modulator, and means for applying a wave to the demodulator adjusted in accordance with the error signal whereby a corrected output signal is supplied by the demodulator corresponding to the data pulses originally transmitted by the carrier system.

12. A method for correcting the distortion of an electrical signal including in combination the steps of remodulating the electrical signal to produce a wave bearing the distorted electrical signal in the form of modulation products, separating selected ones of the modulation products from the remodulated wave, sensing the extent of the distortion in the electrical signal, and demodulating the selected modulation products by comparison of the selected modulation products with a wave having an adjusted frequency in accordance with the extent of the sensed distortion to produce a corrected output signal.

13. A method for correcting the distortion of an electrical signal including in combination the steps of generating a suppressed carrier wave bearing the distorted electrical signal as modulation products falling into two side bands, separating one of the side bands from the other, sensing the extent of the distortion occurring in the electrical signal, generating an alternating current wave of adjusted frequency in accordance with the value of the sensed distortion of the electrical signal, and demodulating the separated side band by comparison with the adjusted frequency alternating current wave to produce a corrected output signal.

14. A method for correcting the distortion of electrical signals transmitted via a carrier transmission system including in combination the steps of transmitting a reference wave along with the electrical signals via the carrier transmission system, remodulating the electrical signals to produce a suppressed carrier wave bearing the electrical signals in the form of modulation products falling into two side bands, separating one of the side bands from the other, deriving a voltage from the reference wave representing the extent of the distortion occurring in the carrier transmission system, generating an adjusted frequency wave in accordance with the voltage representing the distortion, and demodulating the separated side band by comparison with the adjusted frequency wave to produce a corrected output signal corresponding to the electrical signal originally transmitted.

References Cited in the file of this patent

UNITED STATES PATENTS

| | | |
|---|---|---|
| 2,048,080 | Potter | July 21, 1936 |
| 2,298,930 | Decino | Oct. 13, 1942 |
| 2,341,649 | Peterson | Feb. 15, 1944 |
| 2,629,776 | Terry et al. | Feb. 24, 1953 |

| | | |
|---|---|---|
| 2,697,816 | Weaver | Dec. 21, 1954 |
| 2,715,677 | Turner | Aug. 16, 1955 |

OTHER REFERENCES

Text: "Electronic and Radio Engineering," by F. E. Terman (cited by the applicant in column 7, lines 63–65).

Text: "Applied Electronics," by T. S. Gray; 2nd Edition, published by John Wiley and Sons, Inc., Library of Congress Catalog Card No. 54–6261.

UNITED STATES PATENT OFFICE

CERTIFICATION OF CORRECTION

Patent No. 2,963,549 December 6, 1960

Warren A. Christopherson

It is hereby certified that error appears in the above numbered patent requiring correction and that the said Letters Patent should read as corrected below.

Column 1, line 32, for "signal" read -- single --; column 6, line 2, for "different" read -- difference --; column 7, line 65, for "balance" read -- balanced --; line 72, for "carried" read -- carrier --.

Signed and sealed this 23rd day of May 1961.

(SEAL)
Attest:

ERNEST W. SWIDER
Attesting Officer

DAVID L. LADD
Commissioner of Patents